(12) United States Patent
Chen

(10) Patent No.: US 11,170,554 B2
(45) Date of Patent: Nov. 9, 2021

(54) THREE-DIMENSIONAL FACE IMAGE RECONSTRUCTION METHOD AND DEVICE, AND COMPUTER READABLE STORAGE MEDIUM

(71) Applicant: Beijing Bytedance Network Technology Co., Ltd., Beijing (CN)

(72) Inventor: Zhixing Chen, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 16/630,408

(22) PCT Filed: Nov. 27, 2018

(86) PCT No.: PCT/CN2018/117710
§ 371 (c)(1),
(2) Date: Jan. 10, 2020

(87) PCT Pub. No.: WO2020/037863
PCT Pub. Date: Feb. 27, 2020

(65) Prior Publication Data
US 2021/0256752 A1 Aug. 19, 2021

(30) Foreign Application Priority Data
Aug. 24, 2018 (CN) .......................... 201810975740.5

(51) Int. Cl.
*G06T 15/00* (2011.01)
*G06K 9/00* (2006.01)
*G06T 19/20* (2011.01)

(52) U.S. Cl.
CPC .......... *G06T 15/00* (2013.01); *G06K 9/00288* (2013.01); *G06K 9/00302* (2013.01);
(Continued)

(58) Field of Classification Search
None
See application file for complete search history.

(56) References Cited

U.S. PATENT DOCUMENTS 10,796,476 B1 * 10/2020 Xing .................. G06T 15/08
2011/0026849 A1 * 2/2011 Kameyama ........ G06K 9/00308
382/260
(Continued)

FOREIGN PATENT DOCUMENTS

CN 1404016 A 3/2003
CN 102999942 A 3/2013
(Continued)

OTHER PUBLICATIONS

Richardson, Elad, et al. "Learning detailed face reconstruction from a single image." Proceedings of the IEEE conference on computer vision and pattern recognition. 2017. (Year: 2017).*
(Continued)

*Primary Examiner* — Ryan M Gray
(74) *Attorney, Agent, or Firm* — BakerHostetler

(57) ABSTRACT

Techniques for reconstructing three-dimensional face images are described herein. The disclosed techniques include acquiring a real two-dimensional face key point and a predicted two-dimensional face key point; solving a first loss function consisting of the real two-dimensional face key point, the predicted two-dimensional face key point and a preset additional regular constraint term to iteratively optimize an expression coefficient, where the additional regular constraint term is used for constraining the expression coefficient such that the expression coefficient represents a real state of a face; and reconstructing a three-dimensional face image based on the expression coefficient.

18 Claims, 6 Drawing Sheets

(52) U.S. Cl.
CPC .......... *G06T 19/20* (2013.01); *G06T 2215/16* (2013.01); *G06T 2219/2016* (2013.01)

(56) References Cited

U.S. PATENT DOCUMENTS

| | | | | |
|---|---|---|---|---|
| 2016/0148041 | A1* | 5/2016 | Kim | G06K 9/00228 382/118 |
| 2017/0091529 | A1* | 3/2017 | Beeler | G06T 19/20 |
| 2018/0033190 | A1* | 2/2018 | Ma | G06T 13/40 |
| 2018/0130324 | A1* | 5/2018 | Yu | G06K 9/00295 |
| 2019/0019014 | A1* | 1/2019 | Ye | G06K 9/6256 |
| 2020/0097767 | A1* | 3/2020 | Perry | G06K 9/00288 |
| 2021/0104086 | A1* | 4/2021 | Wang | G06N 3/084 |

FOREIGN PATENT DOCUMENTS

| | | |
|---|---|---|
| CN | 103593870 A | 2/2014 |
| CN | 103942822 A | 7/2014 |
| CN | 104346824 A | 2/2015 |
| CN | 106327571 A | 1/2017 |
| CN | 106447763 A | 2/2017 |
| CN | 107358648 A | 11/2017 |
| CN | 108399649 A | 8/2018 |

OTHER PUBLICATIONS

Trigeorgis, George, et al. "Face normals"in-the-wild" using fully convolutional networks." Proceedings of the IEEE Conference on Computer Vision and Pattern Recognition. 2017. (Year: 2017).*
International Patent Application No. PCT/CN2018/117710; Int'l Search Report; dated May 24, 2019; 2 pages.
Liu et al.; "Disentangling Features in 3D Face Shapes for Joint Face Reconstruction and Recognition"; IEEE Conf. on Computer Vision and Pattern Recognition; 2018; 10 pages.

* cited by examiner

THREE-DIMENSIONAL FACE IMAGE RECONSTRUCTION METHOD AND DEVICE, AND COMPUTER READABLE STORAGE MEDIUM

CROSS REFERENCE TO RELATED APPLICATION

The present application is the national phase application of PCT International Patent Application No. PCT/CN2018/117710, filed on Nov. 27, 2018 which claims priority to Chinese Patent Application No. 201810975740.5, titled "THREE-DIMENSIONAL FACE IMAGE RECONSTRUCTION METHOD AND DEVICE, AND COMPUTER READABLE STORAGE MEDIUM", filed on Aug. 24, 2018 with the Chinese Patent Office, all of which are incorporated herein by reference in their entireties.

FIELD

The present disclosure relates to the technical field of three-dimensional reconstruction, and in particular to a three-dimensional face image reconstruction method and device, and a computer readable storage medium.

BACKGROUND

With improvement of device computing power and development of the three-dimensional technology, three-dimensional faces are received more and more attention from academia and industry, and are applied in more and more fields. The three-dimensional reconstruction technology is a source technology of the three-dimensional technology. The conventional three-dimensional reconstruction technology relies on high precision laser radars or multi-view three-dimensional reconstruction. Although these methods are reliable, the laser radars are very demanding on equipment, and the multi-view three-dimensional reconstruction relying on feature point matching is quite time consuming. Therefore, recovering a three-dimensional model from a single picture has become a hot research topic. The three-dimensional face image reconstruction may be used in fields such as face changing, expression synthesis, which have a low precision requirement, and can be implemented by the single picture three-dimensional reconstruction technology.

At present, the three-dimensional face image reconstruction based on a three-dimensional model mainly relies on the matching of two-dimensional and three-dimensional face key points. In a conventional method, a three-dimensional deformable model (i.e., a PCA model decomposed in two dimensions of identity and expression) is firstly established in two dimensions of identity and expression, and an identity coefficient, an expression coefficient, a rotation matrix, a translation vector and a focal length are solved by means of solution optimization, and finally the three-dimensional face is reconstructed through the three-dimensional deformable model and corresponding coefficients.

In the process of solving the expression coefficient, a traditional loss function loss=$\|L_P-L_t\|^2+\lambda\|e\|^2$ is used, where $\|\cdot\|$ represents a two-norm of a vector, $L_P$ represents a position of a predicted two-dimensional key point, $L_t$ represents a position of a real two-dimensional key point, $\lambda$ represents a regular term coefficient, and e represents the expression coefficient.

However, since the single picture is ambiguous in the depth direction, for example, has a near-large and far-small effect, the above-described three-dimensional face image reconstruction technology is liable to lead to erroneous optimization. For example, when the face is rotated to the left and right to produce a large posture, the sizes of two eyes of the three-dimensional face are different, which does not conform to the real result.

SUMMARY

An object of the present disclosure is to provide a three-dimensional face image reconstruction method to at least partially solve a technical problem that a reconstructed face does not conform to a real result. In addition, a three-dimensional face image reconstruction device, a hardware device for three-dimensional face image reconstruction, a computer readable storage medium, and a three-dimensional face image reconstruction terminal are further provided.

In order to achieve the above object, the following technical solutions are provided according to an aspect of the present disclosure.

A three-dimensional face image reconstruction method is provided, which includes:

acquiring a real two-dimensional face key point and a predicted two-dimensional face key point;

solving a first loss function consisting of the real two-dimensional face key point, the predicted two-dimensional face key point and a preset additional regular constraint term to iteratively optimize an expression coefficient, where the additional regular constraint term is used for constraining the expression coefficient such that the expression coefficient represents a real state of a face; and reconstructing a three-dimensional face image based on the expression coefficient.

Further, the method further includes:

acquiring three-dimensional face models of multiple people with different expressions and a three-dimensional face key point on each of the three-dimensional face models; and semantically decomposing the three-dimensional face model and the three-dimensional face key point in an expression dimension to obtain an expression basis vector in a core tensor of the three-dimensional deformable model, where the expression basis vector constitutes the additional regular constraint term.

Further, the additional regular constraint term is expressed as $$\lambda_{sym} \sum_{i \in LB, j \in RB} \|e_i - e_j\|^2,$$

where $\|\cdot\|$ indicates a two-norm of a vector, $\lambda_{sym}$ indicates a regular term coefficient of a portion other than an eye portion, LB indicates an index set of expression basis vectors of a left half portion of the face other than the eye, and RB indicates an index set of an expression basis vectors of a right half portion of the face other than the eye, $e_i$ indicates an i-th expression coefficient of the left half portion of the face other than the eye, and $e_j$ indicates a j-th expression coefficient of the right half portion of the face of other than the eye; or the additional regular constraint term is expressed as $$\lambda_{eye} \sum_{i \in LE, j \in RE} \|e_i - e_j\|^2,$$

where $\lambda_{eye}$ indicates a regular term coefficient of an eye portion, LE indicates an index set of expression basis vectors associated with an left eye, RE indicates an index set of expression basis vectors associated with an right eye, $e_i$ indicates an i-th expression coefficient associated with the left eye, and $e_j$ indicates a j-th expression coefficient associated with the right eye; or the additional regular constraint term is expressed as $$\lambda_{sym} \sum_{i \in LB, j \in RB} \|e_i - e_j\|^2 + \lambda_{eye} \sum_{i \in LE, j \in RE} \|e_i - e_j\|^2.$$

Further, in a case that the additional regular constraint term is expressed as $$\lambda_{sym} \sum_{i \in LB, j \in RB} \|e_i - e_j\|^2,$$

the first loss function is expressed as $$\text{loss} = \|L_P - L_t\|^2 + \lambda \|e\|^2 + \lambda_{sym} \sum_{i \in LB, j \in RB} \|e_i - e_j\|^2; \text{ or}$$

or in a case that the additional regular constraint term is expressed as $$\lambda_{eye} \sum_{i \in LE, j \in RE} \|e_i - e_j\|^2,$$

the first loss function is expressed as $$\text{loss} = \|L_P - L_t\|^2 + \lambda \|e\|^2 + \lambda_{eye} \sum_{i \in LE, j \in RE} \|e_i - e_j\|^2; \text{ or}$$

or in a case that the additional regular constraint term is expressed as $$\lambda_{sym} \sum_{i \in LB, j \in RB} \|e_i - e_j\|^2 + \lambda_{eye} \sum_{i \in LE, j \in RE} \|e_i - e_j\|^2,$$

the first loss function is expressed as $$\text{loss} =$$
$$\|L_P - L_t\|^2 + \lambda \|e\|^2 + \lambda_{sym} \sum_{i \in LB, j \in RB} \|e_i - e_j\|^2 + \lambda_{eye} \sum_{i \in LE, j \in RE} \|e_i - e_j\|^2,$$

where $L_P$ indicates a position of the predicted two-dimensional face key point, $L_t$ indicates a position of the real two-dimensional face key point, $\lambda$ indicates an overall regular term coefficient of the face, and e represents an overall expression coefficient of the face.

Further, $\lambda_{eye}$ is expressed as $$\lambda_{eye} = \begin{cases} \alpha \\ \beta \end{cases},$$

where $\alpha$ indicates a regular term coefficient in a case that a single eye is closed, and $\beta$ indicates a regular term coefficient in a case that two eyes are closed or the two eyes are open.

Further, the method further includes:
determining, based on a distance between two-dimensional key points of upper and lower eyelids of each of the two eyes, an eye closed state of the eye; and
determining a value of $\lambda_{eye}$ based on eye closed states of the two eyes, where a is less than $\beta$.

Further, the method further includes:
decomposing the three-dimensional face model and the three-dimensional face key point in an identity dimension to obtain an identity basis vector in the core tensor; and
acquiring the predicted two-dimensional face key point based on the core tensor including the identity basis vector and the expression basis vector.

Further, the acquiring the predicted two-dimensional face key point based on the core tensor includes:
constructing an initial three-dimensional face image based on a preset initial value of an identity coefficient, a preset initial value of the expression coefficient, and the core tensor; and
performing a rotation and translation operation on the initial three-dimensional face image, and projecting a three-dimensional face marker point in the initial three-dimensional face image on a picture by pinhole imaging, to obtain the predicted two-dimensional face key point.

Further, the method further includes:
solving a second loss function consisting of the real two-dimensional face key point, the predicted two-dimensional face key point and the regular constraint term to iteratively optimize the identity coefficient, where
the reconstructing a three-dimensional face image based on the expression coefficient includes: performing a dot product operation on the expression coefficient and the identity coefficient with the core tensor to obtain the three-dimensional face image.

Further, the method further includes:
solving a third loss function consisting of the real two-dimensional face key point and the predicted two-dimensional face key point to iteratively optimize at least one of parameters including a rotation matrix, a translation vector and a focal length; and
correcting the three-dimensional face image based on the at least one parameter.

In order to achieve the above object, the following technical solutions are provided according to another aspect of the present disclosure.

A three-dimensional face image reconstruction device is provided, which includes:
a two-dimensional key point acquisition module configured to acquire a real two-dimensional face key point and a predicted two-dimensional face key point;
a solving module configured to solve a first loss function consisting of the real two-dimensional face key point, the predicted two-dimensional face key point and a preset additional regular constraint term to iteratively optimize an expression coefficient, where the additional regular constraint term is used for constraining the expression coefficient such that the expression coefficient represents a real state of a face; and a three-dimensional reconstruction module configured to reconstruct a three-dimensional face image based on the expression coefficient.

Further, the device further includes:

a three-dimensional key point acquisition module configured to acquire three-dimensional face models of multiple people with different expressions and a three-dimensional face key point on each of the three-dimensional face models; and a core tensor acquisition module configured to semantically decompose the three-dimensional face model and the three-dimensional face key point in an expression dimension to obtain an expression basis vector in a core tensor of the three-dimensional deformable model, where the expression basis vector constitutes the additional regular constraint term.

Further, the additional regular constraint term is expressed as $$\lambda_{sym} \sum_{i \in LB, j \in RB} \|e_i - e_j\|^2,$$

where $\|\cdot\|$ indicates a two-norm of a vector, $\lambda_{sym}$ indicates a regular term coefficient of a portion other than an eye portion, LB indicates an index set of expression basis vectors of a left half portion of the face other than the eye, and RB indicates an index set of an expression basis vectors of a right half portion of the face other than the eye, $e_i$ indicates an i-th expression coefficient of the left half portion of the face other than the eye, and $e_j$ indicates a j-th expression coefficient of the right half portion of the face of other than the eye; or the additional regular constraint term is expressed as $$\lambda_{eye} \sum_{i \in LE, j \in RE} \|e_i - e_j\|^2,$$

where $\lambda_{eye}$ indicates a regular term coefficient of an eye portion, LE indicates an index set of expression basis vectors associated with an left eye, RE indicates an index set of expression basis vectors associated with an right eye, $e_i$ indicates an i-th expression coefficient associated with the left eye, and $e_j$ indicates a j-th expression coefficient associated with the right eye; or the additional regular constraint term is expressed as $$\lambda_{sym} \sum_{i \in LB, j \in RB} \|e_i - e_j\|^2 + \lambda_{eye} \sum_{i \in LE, j \in RE} \|e_i - e_j\|^2.$$

Further, in a case that the additional regular constraint term is expressed as $$\lambda_{sym} \sum_{i \in LB, j \in RB} \|e_i - e_j\|^2,$$

the first loss function is expressed as $$loss = \|L_P - L_t\|^2 + \lambda \|e\|^2 + \lambda_{sym} \sum_{i \in LB, j \in RB} \|e_i - e_j\|^2;$$

or in a case that the additional regular constraint term is expressed as $$\lambda_{eye} \sum_{i \in LE, j \in RE} \|e_i - e_j\|^2,$$

the first loss function is expressed as $$loss = \|L_P - L_t\|^2 + \lambda \|e\|^2 + \lambda_{eye} \sum_{i \in LE, j \in RE} \|e_i - e_j\|^2;$$

or in a case that the additional regular constraint term is expressed as $$\lambda_{sym} \sum_{i \in LB, j \in RB} \|e_i - e_j\|^2 + \lambda_{eye} \sum_{i \in LE, j \in RE} \|e_i - e_j\|^2,$$

the first loss function is expressed as $$loss = \|L_P - L_t\|^2 + \lambda \|e\|^2 + \lambda_{sym} \sum_{i \in LB, j \in RB} \|e_i - e_j\|^2 + \lambda_{eye} \sum_{\in LE, \in RE} \|e_i - e_j\|^2,$$

where $L_P$ indicates a position of the predicted two-dimensional face key point, $L_t$ indicates a position of the real two-dimensional face key point, $\lambda$ indicates an overall regular term coefficient of the face, and e represents an overall expression coefficient of the face.

Further, $\lambda_{eye}$ is expressed as $$\lambda_{eye} = \begin{cases} \alpha, \\ \beta, \end{cases}$$

where $\alpha$ indicates a regular term coefficient in a case that a single eye is closed, and $\beta$ indicates a regular term coefficient in a case that two eyes are closed or the two eyes are open.

Further, the device further includes:

an eye state determining module configured to: determine, based on a distance between two-dimensional key points of upper and lower eyelids of each of the two eyes, an eye closed state of the eye; and determine a value of $\lambda_{eye}$ based on eye closed states of the two eyes, where $\alpha$ is less than $\beta$.

Further, the core tensor acquisition module is further configured to: decompose the three-dimensional face model and the three-dimensional face key point in an identity dimension to obtain an identity basis vector in the core tensor; and acquire the predicted two-dimensional face key point based on the core tensor including the identity basis vector and the expression basis vector.

Further, the core tensor acquisition module is configured to: construct an initial three-dimensional face image based on a preset initial value of an identity coefficient, a preset initial value of the expression coefficient, and the core tensor; and perform a rotation and translation operation on the initial three-dimensional face image, and project a three-dimensional face marker point in the initial three-dimensional face image on a picture by pinhole imaging, to obtain the predicted two-dimensional face key point.

Further, the solving module is further configured to: solve a second loss function consisting of the real two-dimensional face key point, the predicted two-dimensional face key point and the regular constraint term to iteratively optimize the identity coefficient. The three-dimensional reconstruction module is configured to: perform a dot product operation on the expression coefficient and the identity coefficient with the core tensor to obtain the three-dimensional face image.

Further, the solving module is further configured to: solve a third loss function consisting of the real two-dimensional face key point and the predicted two-dimensional face key point to iteratively optimize at least one of parameters including a rotation matrix, a translation vector and a focal length; and correct the three-dimensional face image based on the at least one parameter.

In order to achieve the above object, the following technical solutions are provided according to another aspect of the present disclosure.

A hardware device for three-dimensional face image reconstruction is provided. The hardware device includes:

a memory configured to store non-transitory computer readable instructions; and a processor configured to execute the computer readable instructions to perform any one of the three-dimensional face image reconstruction methods described above.

In order to achieve the above object, the following technical solutions are provided according to another aspect of the present disclosure.

A computer readable storage medium having stored thereon non-transitory computer readable instructions is provided. When executed by a computer, the non-transitory computer readable instructions cause the computer to perform any one of the three-dimensional face image reconstruction methods described above.

In order to achieve the above object, the following technical solutions are provided according to another aspect of the present disclosure.

A three-dimensional face image reconstruction terminal is provided, which includes any one of the three-dimensional face image reconstruction devices described above.

There are provided a three-dimensional face image reconstruction method, a three-dimensional face image reconstruction device, a hardware device for three-dimensional face image reconstruction, a computer readable storage medium and a three-dimensional face image reconstruction terminal according to embodiments of the present disclosure. The three-dimensional face image reconstruction method includes: acquiring a real two-dimensional face key point and a predicted two-dimensional face key point; solving a first loss function consisting of the real two-dimensional face key point, the predicted two-dimensional face key point and a preset additional regular constraint term to iteratively optimize an expression coefficient, where the additional regular constraint term is used for constraining the expression coefficient such that the expression coefficient represents a real state of a face; and reconstructing a three-dimensional face image based on the expression coefficient. In the embodiments of the present disclosure, the first loss function consisting of the real two-dimensional face key point, the predicted two-dimensional face key point, and the preset additional regular constraint term for constraining the expression coefficient is solved to iteratively optimize the expression coefficient, such that the expression coefficient can represent the real state of the face, which optimizes the three-dimensional face image reconstruction technology, so as to obtain the real state of the face.

The above description is only an overview of the technical solutions of the present disclosure. In order to more clearly understand technical means used in the present disclosure to implement the present disclosure as stated in this specification, and to more clearly understood the above and other objects, features and advantages of the present disclosure, preferred embodiments are described in detail below with reference to the drawings.

DETAILED DESCRIPTION OF EMBODIMENTS

Figure 1A:
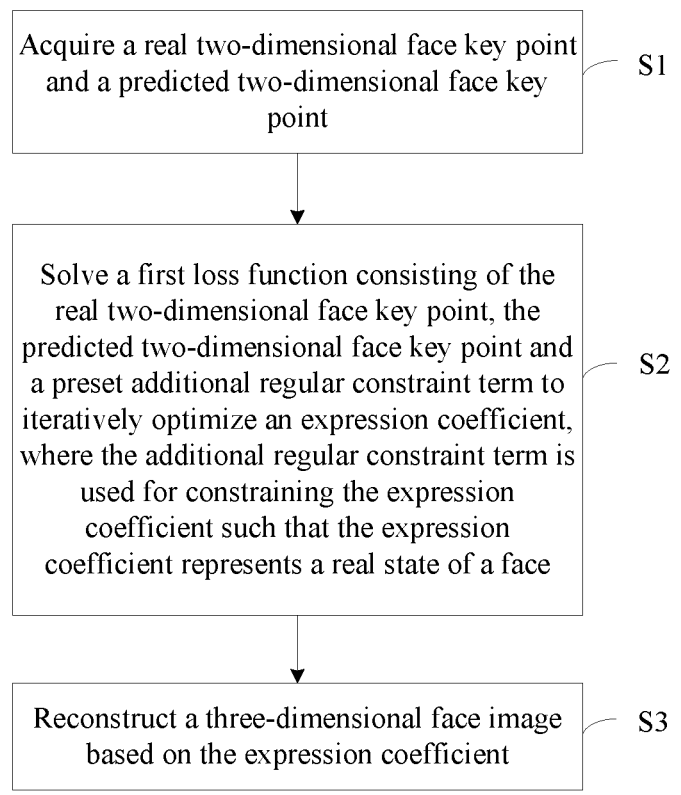
FIG. 1a is a schematic flow chart of a three-dimensional face image reconstruction method according to an embodiment of the present disclosure.

Embodiments of the present disclosure are described below by specific examples, and those skilled in the art may easily understand other advantages and effects of the present disclosure based on contents disclosed in this specification. It is apparent that the described embodiments are only a part of the embodiments of the present disclosure, rather than all embodiments. The present disclosure may be implemented or applied by various other specific embodiments, and various modifications and changes may be made to details of this specification based on different views and applications without departing from the spirit of the present disclosure. It should be noted that the following embodiments and features in the embodiments may be combined with each other without conflict. All other embodiments obtained by those skilled in the art based on the embodiments of the present disclosure without any creative work fall in the protection scope of the present disclosure.

It should be noted that various aspects of the embodiments within the scope of the appended claims are described below. It is apparent that, the aspects described herein may be embodied in a wide variety of forms, and any particular structure and/or function described herein is merely illustrative. Based on the present disclosure, those skilled in the art should appreciate that, one aspect described herein may be implemented independently of any other aspects and two or more of these aspects may be combined in various ways. For example, the device and/or method may be implemented using any number of the aspects set forth herein. In addition, the device and/or method may be implemented using other structures and/or functionalities than one or more of the aspects set forth herein.

It should further be noted that the drawings provided in the following embodiments merely illustrate the basic concept of the present disclosure in a schematic manner, and only components related to the present disclosure are shown in the drawings. The drawings are not drawn based on the number, the shape and the size of components in actual implementation. The type, the number and the proportion of the components may be changed randomly in the actual implementation, and a layout of the components may be more complicated.

In addition, in the following description, specific details are provided to facilitate a thorough understanding of the examples. However, those skilled in the art should appreciate that the aspects may be practiced without these specific details.

In order to solve the technical problem of how to improve user experience, a three-dimensional face image reconstruction method is provided according to an embodment of the present disclosure. As shown in FIG. 1a, the three-dimensional face image reconstruction method mainly includes the following steps S1 to S3.

In step S1, a real two-dimensional face key point and a predicted two-dimensional face key point are acquired.

The real two-dimensional face key point is obtained from a two-dimensional face image that is pre-photographed. Specifically, the two-dimensional face image may be inputted into a pre-trained neural network (for example, a convolutional neural network) to obtain a two-dimensional face key point by training. The two-dimensional face key point is used as the real two-dimensional face key point.

The predicted two-dimensional face key point is a face key point obtained by prediction, for example, a face key point obtained by prediction based on an initially reconstructed three-dimensional face image.

In step S2, a first loss function consisting of the real two-dimensional face key point, the predicted two-dimensional face key point and a preset additional regular constraint term is solved to iteratively optimize an expression coefficient. The additional regular constraint term is used for constraining the expression coefficient such that the expression coefficient represents a real state of a face.

The expression coefficient represents the state of the face, for example, including but not limited to, mouth opening, eye closure and cheek blowing.

In order to distinguish loss functions of different meanings appearing in the present disclosure from each other, a loss function appearing the earliest is defined as the first loss function, and loss functions appearing subsequently are respectively defined as a second loss function and a third loss function according to the order of appearance.

In step S3: a three-dimensional face image is reconstructed based on the expression coefficient.

In this embodiment, the first loss function consisting of the real two-dimensional face key point, the predicted two-dimensional face key point, and the preset additional regular constraint term for constraining the expression coefficient is solved to iteratively optimize the expression coefficient, such that the expression coefficient can represent the real state of the face, which optimizes the three-dimensional face image reconstruction technology, so as to obtain the real state of the face.

Figure 1B:
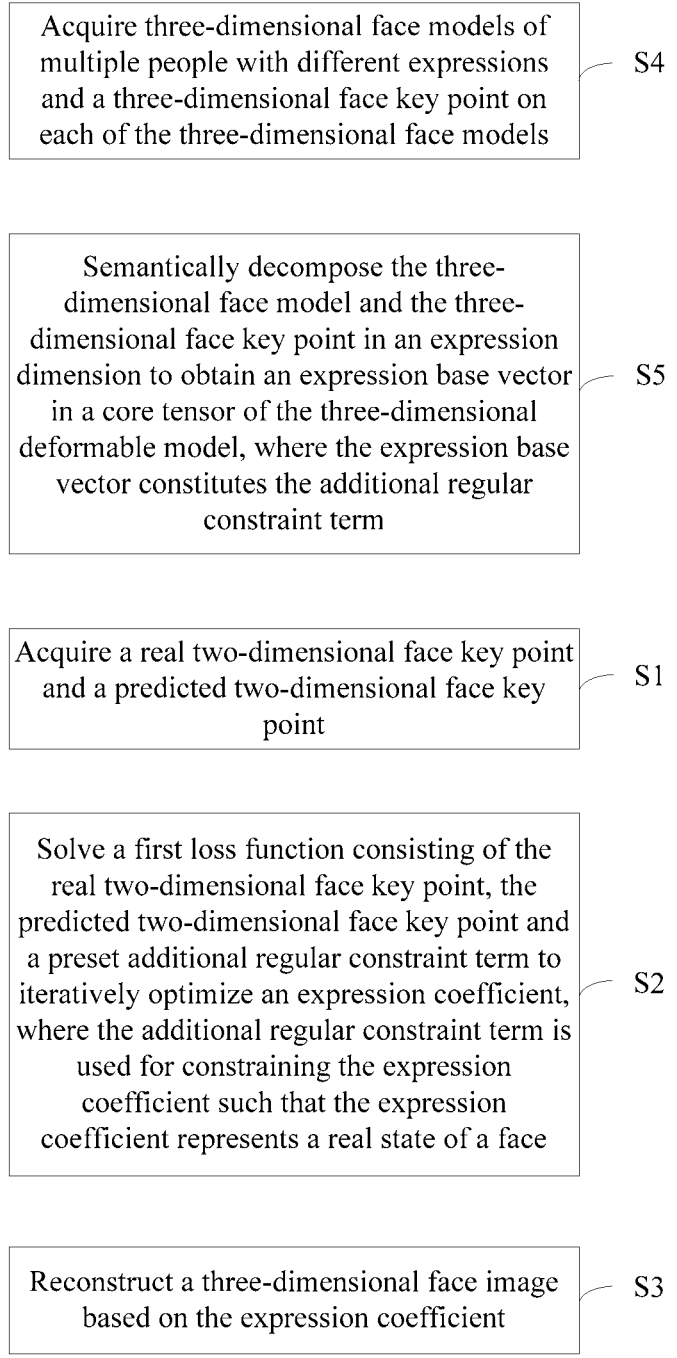
FIG. 1b is a schematic flow chart of a three-dimensional face image reconstruction method according to another embodiment of the present disclosure.

In an optional embodiment, as shown in FIG. 1b, the method according to this embodiment further includes the following steps S4 and S5.

In S4, three-dimensional face models of multiple people with different expressions and a three-dimensional face key point on each of the three-dimensional face models are acquired.

In S5, the three-dimensional face model and the three-dimensional face key point are semantically decomposed in an expression dimension to obtain an expression basis vector in a core tensor of the three-dimensional deformable model. The expression basis vector constitutes the additional regular constraint term.

Specifically, three-dimensional face models of different people with different expressions and a three-dimensional face marker point on each of the three-dimensional face models may be pre-acquired by a depth camera or the like. Then, the three-dimensional face model and the three-dimensional face marker point are semantically decomposed in an expression dimension to obtain the expression basis vector in the core tensor of the three-dimensional deformable model. In determining the additional regular constraint term, the expression basis vector is taken into account to constrain the expression coefficient, so that the expression coefficient can more accurately represent the real state of the face.

In this embodiment, by acquiring the expression basis vector and taking the expression basis vector into consideration for constraining the expression coefficient in determining the additional regular constraint term, the expression coefficient can more accurately represent the real state of the face.

Further, the additional regular constraint term is expressed as $$\lambda_{sym} \sum_{i \in LB, j \in RB} \|e_i - e_j\|^2,$$

where $\|\cdot\|$ indicates a two-norm of a vector, $\lambda_{sym}$ indicates a regular term coefficient of a portion other than an eye portion, LB indicates an index set of expression basis vectors of a left half portion of the face other than the eye, and RB indicates an index set of an expression basis vectors of a right half portion of the face other than the eye, $e_i$ indicates an i-th expression coefficient of the left half portion of the face other than the eye, and $e_j$ indicates a j-th expression coefficient of the right half portion of the face of other than the eye; or the additional regular constraint term is expressed as $$\lambda_{eye} \sum_{i \in LB, j \in RE} \|e_i - e_j\|^2,$$

where $\lambda$ indicates a regular term coefficient of an eye portion, LE indicates an index set of expression basis vectors associated with an left eye, RE indicates an index set of expression basis vectors associated with an right eye, $e_i$ indicates an i-th expression coefficient associated with the left eye, and $e_j$ indicates a j-th expression coefficient associated with the right eye; or the additional regular constraint term is expressed as $$\lambda_{sym} \sum_{i \in LB, j \in RB} \|e_i - e_j\|^2 + \lambda_{eye} \sum_{i \in LB, j \in RE} \|e_i - e_j\|^2.$$

Further, in a case that the additional regular constraint term is expressed as $$\lambda_{sym} \sum_{i \in LB, j \in RB} \|e_i - e_j\|^2,$$

the first loss function is expressed as $$loss = \|L_P - L_t\|^2 + \lambda \|e\|^2 + \lambda_{sym} \sum_{i \in LB, j \in RB} \|e_i - e_j\|^2;$$

or in a case that the additional regular constraint term is expressed as $$\lambda_{eye} \sum_{i \in LE, j \in RE} \|e_i - e_j\|^2,$$

the first loss function is expressed as $$loss = \|L_P - L_t\|^2 + \lambda \|e\|^2 + \lambda_{eye} \sum_{i \in LE, j \in RE} \|e_i - e_j\|^2;$$

or in a case that the additional regular constraint term is expressed as $$\lambda_{sym} \sum_{i \in LB, j \in RB} \|e_i - e_j\|^2 + \lambda_{eye} \sum_{i \in LE, j \in RE} \|e_i - e_j\|^2,$$

the first loss function is expressed as $$loss = \|L_P - L_t\|^2 + \lambda \|e\|^2 + \lambda_{sym} \sum_{i \in LB, j \in RB} \|e_i - e_j\|^2 + \lambda_{eye} \sum_{i \in LE, j \in RE} \|e_i - e_j\|^2,$$

where $L_P$ indicates a position of the predicted two-dimensional face key point, $L_t$ indicates a position of the real two-dimensional face key point, $\lambda$ indicates an overall regular term coefficient of the face, and e represents an overall expression coefficient of the face.

Further, $\lambda_{eye}$ is expressed as $$\lambda_{eye} = \begin{cases} \alpha, \\ \beta, \end{cases}$$

where $\alpha$ indicates a regular term coefficient in a case that a single eye is closed, and $\beta$ indicates a regular term coefficient in a case that two eyes are closed or the two eyes are open.

Further, the method according to this embodiment further includes:

determining, based on a distance between two-dimensional key points of upper and lower eyelids of each of the two eyes, an eye closed state of the eye; and determining a value of $\lambda_{eye}$ based on eye closed states of the two eyes, where $\alpha$ is less than $\beta$.

Specifically, in order to avoid ambiguity caused by the near-large and far-small effect, for example, the sizes of the two eyes are different, the regular constraint term corresponding to the eye is added in the optimization to constrain the expression coefficient in the embodiment, so that the states of the two eyes approach real states as much as possible. For the face with one eye closed and the other eye open, which eye is closed can be identified by calculating a distance between two-dimensional face marker points of upper and lower eyelids of each of the two eyes. In a case that the distance is less than a preset threshold, the eye is considered to be closed. In a case that the distance is greater than or equal to the preset threshold, the eye is considered to be open. In the case that one eye is closed and the other eye is open, the value of $\alpha$ is small, making it almost ineffective to ensure that a single eye can be closed. In a case that both of the two eyes are open or closed, the value of $\beta$ is large, ensuring the two eyes are in the same size.

Optimal values of the parameters are given as follows: $\lambda=5.0$, $\lambda_{sym}=10.0$, $\alpha=0.05$, $\beta=20.0$.

In an optional embodiment, the method according to this embodiment further includes the following steps S6 and S7.

In S6, the three-dimensional face model and the three-dimensional face key point are decomposed in an identity dimension to obtain an identity basis vector in the core tensor.

Principal Component Analysis (PCA) decomposition may be performed in the identity dimension, to obtain a PCA basis vector as the identity basis vector.

In S7, the predicted two-dimensional face key point is acquired based on the core tensor including the identity basis vector and the expression basis vector.

Further, step S7 specifically includes the following steps S71 and S72.

In S71, an initial three-dimensional face image is constructed based on a preset initial value of the identity coefficient, a preset initial value of the expression coefficient, and the core tensor.

The identity coefficient represents the shape of the face, for example, including but not limited to, a long face, a round face, and an oval face.

The core tensor includes the identity basis vector and the expression basis vector. Specifically, a dot product operation may be performed on the initial value of the identity coefficient and the initial value of the expression coefficient with the core tensor to obtain the initial three-dimensional face image.

In S72, a rotation and translation operation is performed on the initial three-dimensional face image, and a three-dimensional face marker point in the initial three-dimensional face image is projected on a picture by pinhole imaging, to obtain the predicted two-dimensional face key point.

In an optional embodiment, the method according to this embodiment further includes the following step S8.

In S8, a second loss function consisting of the real two-dimensional face key point, the predicted two-dimensional face key point and the regular constraint term is solved to iteratively optimize the identity coefficient. The second loss function is expressed as loss=$\|L_P-L_A\|^2+\lambda\|e\|^2$.

Step S3 includes: performing a dot product operation on the expression coefficient and the identity coefficient with the core tensor to obtain the three-dimensional face image.

The core tensor includes the expression basis vector and the identity basis vector.

In an optional embodiment, the method according to this embodiment further includes the following steps S9 and S10.

In S9, a third loss function consisting of the real two-dimensional face key point and the predicted two-dimensional face key point is solved to iteratively optimize at least one of parameters including a rotation matrix, a translation vector and a focal length.

The third loss function is expressed as loss=$\|L_P-L_A\|^2$. The focal length may be obtained by solving the minimum value of the loss function by a trichotomy method. The rotation matrix and the translation vector may be obtained by a gradient descent method.

In S10, the three-dimensional face image is corrected based on the at least one parameter.

Since the reconstructed three-dimensional face image may have a wrong position, correction is required to be performed. The above problem can be solved by a solution of this embodiment.

Those skilled in the art should appreciate that significant variations (e.g., combinations of listed modes) or equivalents may be made to the various embodiments described above.

In the above, although various steps in the embodiment of the three-dimensional face image reconstruction method are described in the above-described order, those skilled in the art should understand that, the steps in the embodiments of the present disclosure are not necessarily performed in the above order, and may also be performed in the reversed order, in parallel, alternately, or the like. Other steps may be added to the above steps by those skilled in the art. These significant variations or equivalents are also included in the protection scope of the present disclosure, which is not repeated herein.

A device embodiment of the present disclosure is described in the following. The device embodiment of the present disclosure may be used to perform the steps of the method embodiments of the present disclosure. For the convenience of description, only parts related to the embodiments of the present disclosure are shown, and specific technical details are not shown, which refers to the method embodiments of the present disclosure.

Figure 2A:
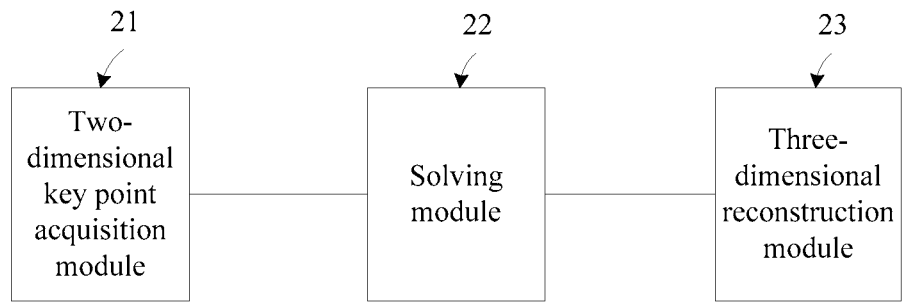
FIG. 2a is a schematic structural diagram of a three-dimensional face image reconstruction device according to an embodiment of the present disclosure.

In order to solve the technical problem of how to improve user experience, a three-dimensional face image reconstruction device is provided according to an embedment of the present disclosure. The device may perform the steps in the embodiments of the three-dimensional face image reconstruction method described above. As shown in FIG. 2a, the device mainly includes: a two-dimensional key point acquisition module 21, a solving module 22, and a three-dimensional reconstruction module 23. The two-dimensional key point acquisition module 21 is configured to acquire a real two-dimensional face key point and a predicted two-dimensional face key point. The solving module 22 is configured to solve a first loss function consisting of the real two-dimensional face key point, the predicted two-dimensional face key point and a preset additional regular constraint term to iteratively optimize an expression coefficient. The additional regular constraint term is used for constraining the expression coefficient such that the expression coefficient represents a real state of a face. The three-dimensional reconstruction module 23 is configured to reconstruct a three-dimensional face image based on the expression coefficient.

The real two-dimensional face key point is obtained from a two-dimensional face image that is pre-photographed. Specifically, the two-dimensional face image may be inputted into a pre-trained neural network (for example, a convolutional neural network) to obtain a two-dimensional face key point by training. The two-dimensional face key point is used as the real two-dimensional face key point.

The predicted two-dimensional face key point is a face key point obtained by prediction, for example, a face key point obtained by prediction based on an initially reconstructed three-dimensional face image.

The expression coefficient represents the state of the face, for example, including but not limited to, mouth opening, eye closure and cheek blowing.

In this embodiment, the solving module 22 solves the first loss function consisting of the real two-dimensional face key point, the predicted two-dimensional face key point, and the preset additional regular constraint term for constraining the expression coefficient, to iteratively optimize the expression coefficient, such that the expression coefficient can represent the real state of the face, which optimizes the three-dimensional face image reconstruction technology, so as to obtain the real state of the face.

Figure 2B:
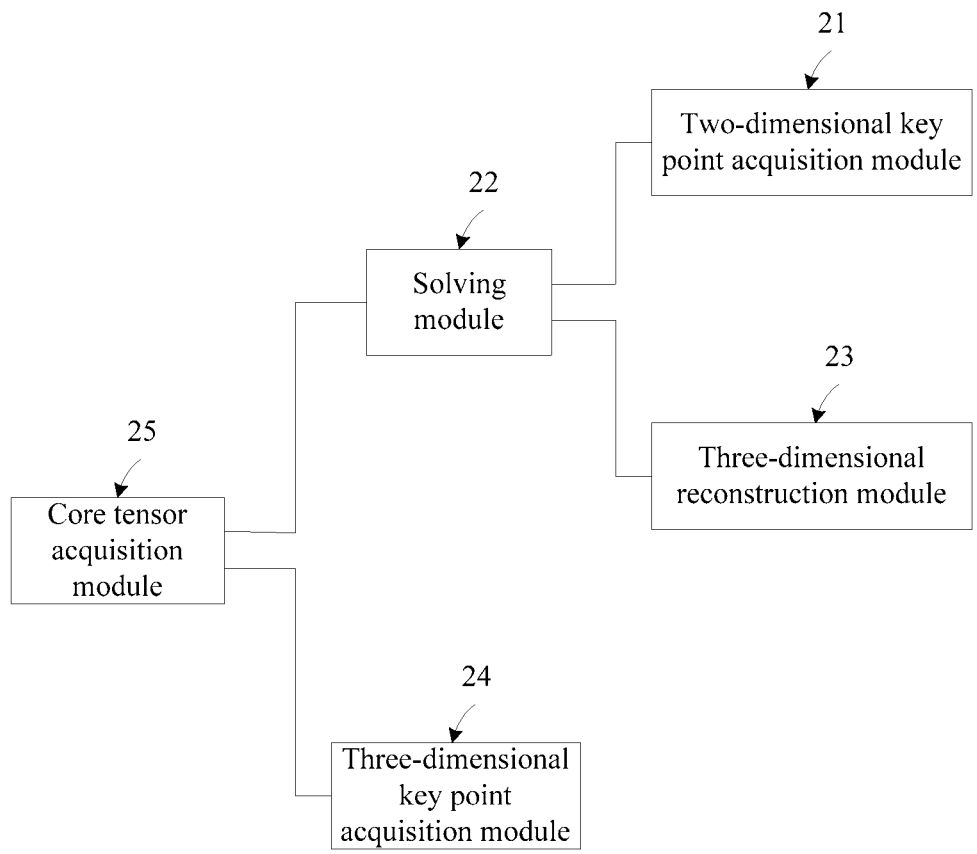
FIG. 2b is a schematic structural diagram of a three-dimensional face image reconstruction device according to another embodiment of the present disclosure.

In an optional embodiment, as shown in FIG. 2b, the device according to this embodiment further includes: a three-dimensional key point acquisition module 24, and a core tensor acquisition module 25.

The three-dimensional key point acquisition module 24 is configured to acquire three-dimensional face models of multiple people with different expressions and a three-dimensional face key point on each of the three-dimensional face models.

The core tensor acquisition module 25 is configured to semantically decompose the three-dimensional face model and the three-dimensional face key point in an expression dimension to obtain an expression basis vector in a core tensor of the three-dimensional deformable model. The expression basis vector constitutes the additional regular constraint term.

Specifically, the three-dimensional key point acquisition module 24 may pre-acquire three-dimensional face models of different people with different expressions and a three-dimensional face marker point on each of the three-dimensional face models by a depth camera or the like. Then, the core tensor acquisition module 25 semantically decomposes the three-dimensional face model and the three-dimensional face marker point in an expression dimension to obtain the expression basis vector in the core tensor of the three-dimensional deformable model. In determining the additional regular constraint term, the expression basis vector is taken into account to constrain the expression coefficient, so that the expression coefficient can more accurately represent the real state of the face.

In this embodiment, by acquiring the expression basis vector and taking the expression basis vector into consideration for constraining the expression coefficient in determining the additional regular constraint term, the expression coefficient can more accurately represent the real state of the face.

Further, the additional regular constraint term is expressed as $$\lambda_{sym} \sum_{i \in LB, j \in RB} \|e_i - e_j\|^2,$$

where $\|\cdot\|$ indicates a two-norm of a vector, $\lambda_{sym}$ indicates a regular term coefficient of a portion other than an eye portion, LB indicates an index set of expression basis vectors of a left half portion of the face other than the eye, and RB indicates an index set of an expression basis vectors of a right half portion of the face other than the eye, $e_i$ indicates an i-th expression coefficient of the left half portion of the face other than the eye, and $e_j$ indicates a j-th expression coefficient of the right half portion of the face of other than the eye; or the additional regular constraint term is expressed as $$\lambda_{eye} \sum_{i \in LE, j \in RE} \|e_i - e_j\|^2,$$

where $\lambda_{eye}$ indicates a regular term coefficient of an eye portion, LE indicates an index set of expression basis vectors associated with an left eye, RE indicates an index set of expression basis vectors associated with an right eye, $e_i$ indicates an i-th expression coefficient associated with the left eye, and $e_j$ indicates a j-th expression coefficient associated with the right eye; or the additional regular constraint term is expressed as $$\lambda_{sym} \sum_{i \in LB, j \in RB} \|e_i - e_j\|^2 + \lambda_{eye} \sum_{i \in LE, j \in RE} \|e_i - e_j\|^2.$$

Further, in a case that the additional regular constraint term is expressed as $$\lambda_{sym} \sum_{i \in LB, j \in RB} \|e_i - e_j\|^2,$$

the first loss function is expressed as $$\text{loss} = \|L_P - L_t\|^2 + \lambda \|e\|^2 + \lambda_{sym} \sum_{i \in LB, j \in RB} \|e_i - e_j\|^2;$$

or in a case that the additional regular constraint term is expressed as $$\lambda_{eye} \sum_{i \in LE, j \in RE} \|e_i - e_j\|^2,$$

the first loss function is expressed as $$\text{loss} = \|L_P - L_t\|^2 + \lambda \|e\|^2 + \lambda_{eye} \sum_{i \in LE, j \in RE} \|e_i - e_j\|^2;$$

or in a case that the additional regular constraint term is expressed as $$\lambda_{sym} \sum_{i \in LB, j \in RB} \|e_i - e_j\|^2, + \lambda_{eye} \sum_{i \in LE, j \in RE} \|e_i - e_j\|^2,$$

the first loss function is expressed as $$\text{loss} = \|L_P - L_t\|^2 + \lambda \|e\|^2 + \lambda_{sym} \sum_{i \in LB, j \in RB} \|e_i - e_j\|^2 + \lambda_{eye} \sum_{i \in LE, j \in RE} \|e_i - e_j\|^2,$$

where $L_P$ indicates a position of the predicted two-dimensional face key point, $L_t$ indicates a position of the real two-dimensional face key point, $\lambda$ indicates an overall regular term coefficient of the face, and e represents an overall expression coefficient of the face.

Further, $\lambda_{eye}$ is expressed as $$\lambda_{eye} = \begin{cases} \alpha, \\ \beta \end{cases}$$

where $\alpha$ indicates a regular term coefficient in a case that a single eye is closed, and $\beta$ indicates a regular term coefficient in a case that two eyes are closed or the two eyes are open.

Further, the device further includes an eye state determination module. The eye state determining module is configured to determine, based on a distance between two-dimensional key points of upper and lower eyelids of each of the two eyes, an eye closed state of the eye; and determine a value of $\lambda_{eye}$ based on eye closed states of the two eyes, where $\alpha$ is less than $\beta$.

Specifically, in order to avoid ambiguity caused by the near-large and far-small effect, for example, the sizes of the two eyes are different, the regular constraint term corresponding to the eye is added in the optimization to constrain the expression coefficient in the embodiment, so that the states of the two eyes approach real states as much as possible. For the face with one eye closed and the other eye open, which eye is closed can be identified by calculating a distance between two-dimensional face marker points of upper and lower eyelids of each of the two eyes. In a case that the distance is less than a preset threshold, the eye is considered to be closed. In a case that the distance is greater than or equal to the preset threshold, the eye is considered to be open. In the case that one eye is closed and the other eye is open, the value of $\alpha$ is small, making it almost ineffective to ensure that a single eye can be closed. In a case that both of the two eyes are open or closed, the value of $\beta$ is large, ensuring the two eyes are in the same size.

Optimal values of the parameters are given as follows: $\lambda=5.0$, $\lambda_{sym}=10.0$, $\alpha=0.05$, $\beta=20.0$.

In an optional embodiment, the core tensor acquisition module 25 is further configured to: decompose the three-dimensional face model and the three-dimensional face key point in an identity dimension to obtain an identity basis vector in the core tensor; and acquire the predicted two-dimensional face key point based on the core tensor including the identity basis vector and the expression basis vector.

Principal Component Analysis (PCA) decomposition may be performed in the identity dimension, to obtain a PCA basis vector as the identity basis vector.

Further, the core tensor acquisition module 25 is configured to: construct an initial three-dimensional face image based on a preset initial value of an identity coefficient, a preset initial value of the expression coefficient, and the core tensor; and perform a rotation and translation operation on the initial three-dimensional face image, and project a three-dimensional face marker point in the initial three-dimensional face image on a picture by pinhole imaging, to obtain the predicted two-dimensional face key point.

The identity coefficient represents the shape of the face, for example, including but not limited to, a long face, a round face, and an oval face.

The core tensor includes the identity basis vector and the expression basis vector. Specifically, a dot product operation may be performed on the initial value of the identity coefficient and the initial value of the expression coefficient with the core tensor to obtain the initial three-dimensional face image.

In an optional embodiment, the solving module 22 is further configured to: solve a second loss function consisting of the real two-dimensional face key point, the predicted two-dimensional face key point and the regular constraint term to iteratively optimize the identity coefficient. The second loss function is expressed as $loss=\|L_P-L_t\|^2+\lambda\|e\|^2$.

The three-dimensional reconstruction module 23 is configured to: perform a dot product operation on the expression coefficient and the identity coefficient with the core tensor to obtain the three-dimensional face image. The core tensor includes the expression basis vector and the identity basis vector.

In an optional embodiment, the solving module 23 is further configured to: solve a third loss function consisting of the real two-dimensional face key point and the predicted two-dimensional face key point to iteratively optimize at least one of parameters including a rotation matrix, a translation vector and a focal length; and correct the three-dimensional face image based on the at least one parameter.

The third loss function is expressed as $loss=\|L_P-L_t\|^2$. The focal length may be obtained by solving the minimum value of the loss function by a trichotomy method. The rotation matrix and the translation vector may be obtained by a gradient descent method.

Since the reconstructed three-dimensional face image may have a wrong position, correction is required to be performed. The above problem can be solved by a solution of this embodiment.

For a detailed description of the working principle, the technical effect, and the like of the embodiment of the three-dimensional face image reconstruction device, reference may be made to the related description in the foregoing three-dimensional face image reconstruction method embodiment, and details are not described herein again.

Figure 3:
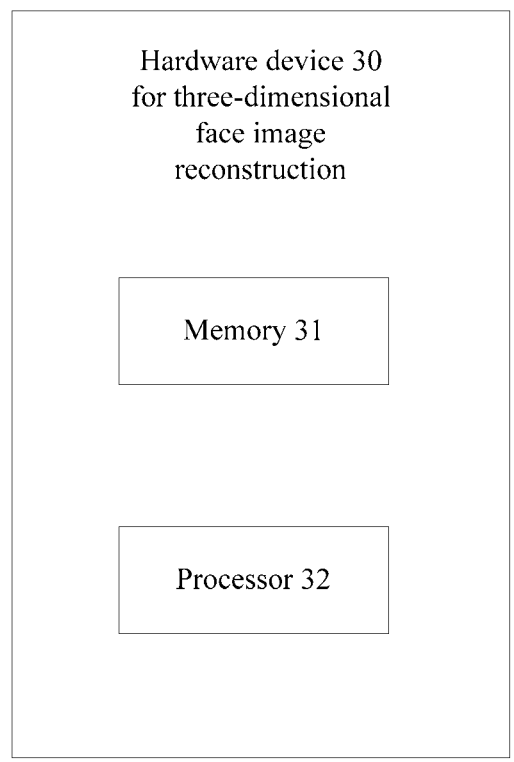
FIG. 3 is a schematic structural diagram of a hardware device for three-dimensional face image reconstruction according to an embodiment of the present disclosure.

FIG. 3 is a hardware block diagram showing a hardware device for three-dimensional face image reconstruction according to an embodiment of the present disclosure. As shown in FIG. 3, a hardware device 30 for three-dimensional face image reconstruction according to an embodiment of the present disclosure includes a memory 31 and a processor 32.

The memory 31 is configured to store non-transitory computer readable instructions. Specifically, the memory 31 may include one or more computer program products, which may include various forms of computer readable storage media, such as a volatile memory and/or a non-volatile memory. The volatile memory may include, for example, a random access memory (RAM) and/or a cache. The non-volatile memory may include, for example, a read only memory (ROM), a hard disk, or a flash memory.

The processor 32 may be a central processing unit (CPU) or other form of processing unit with data processing capabilities and/or instruction execution capabilities, and may control other components in the hardware device 30 for three-dimensional face image reconstruction to perform desired functions. In an embodiment of the present disclosure, the processor 32 is configured to execute the computer readable instructions stored in the memory 31 such that the hardware device 30 for three-dimensional face image reconstruction performs all or a part of the steps in the three-dimensional face image reconstruction method according to the embodiments of the present disclosure.

Those skilled in the art should understand that, in order to solve the technical problem of how to obtain good user experience, the present embodiment may also include well-known structures such as a communication bus and an interface, and these well-known structures are also included in the protection scope of the present disclosure.

For a detailed description of the present embodiment, reference may be made to the corresponding description in the foregoing embodiments, and details are not described herein again.

Figure 4:
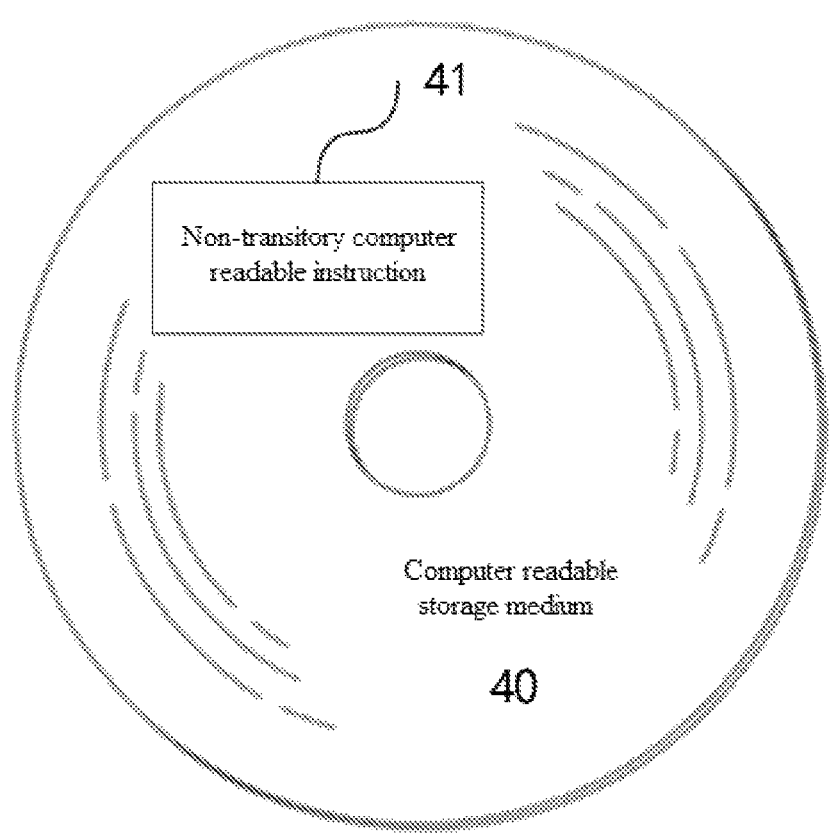
FIG. 4 is a schematic structural diagram of a computer readable storage medium according to an embodiment of the present disclosure.

FIG. 4 is a schematic diagram showing a computer readable storage medium according to an embodiment of the present disclosure. As shown in FIG. 4, a computer readable storage medium 40 according to an embodiment of the present disclosure has stored thereon non-transitory computer readable instructions 41. When executed by a processor, the non-transitory computer readable instructions 41 cause the processor to perform all or a part of the steps in the video feature comparison method according to the embodiments of the present disclosure.

The computer readable storage medium 40 includes, but is not limited to, an optical storage medium (for example, CD-ROM and DVD), a magneto-optical storage medium (for example, MO), a magnetic storage medium (for example, a magnetic tape or a mobile hard disk), a medium (for example, a memory card) having a built-in rewritable non-volatile memory, and a medium (for example, a ROM box) having a built-in ROM.

For a detailed description of the present embodiment, reference may be made to the corresponding description in the foregoing embodiments, and details are not described herein again.

Figure 5:
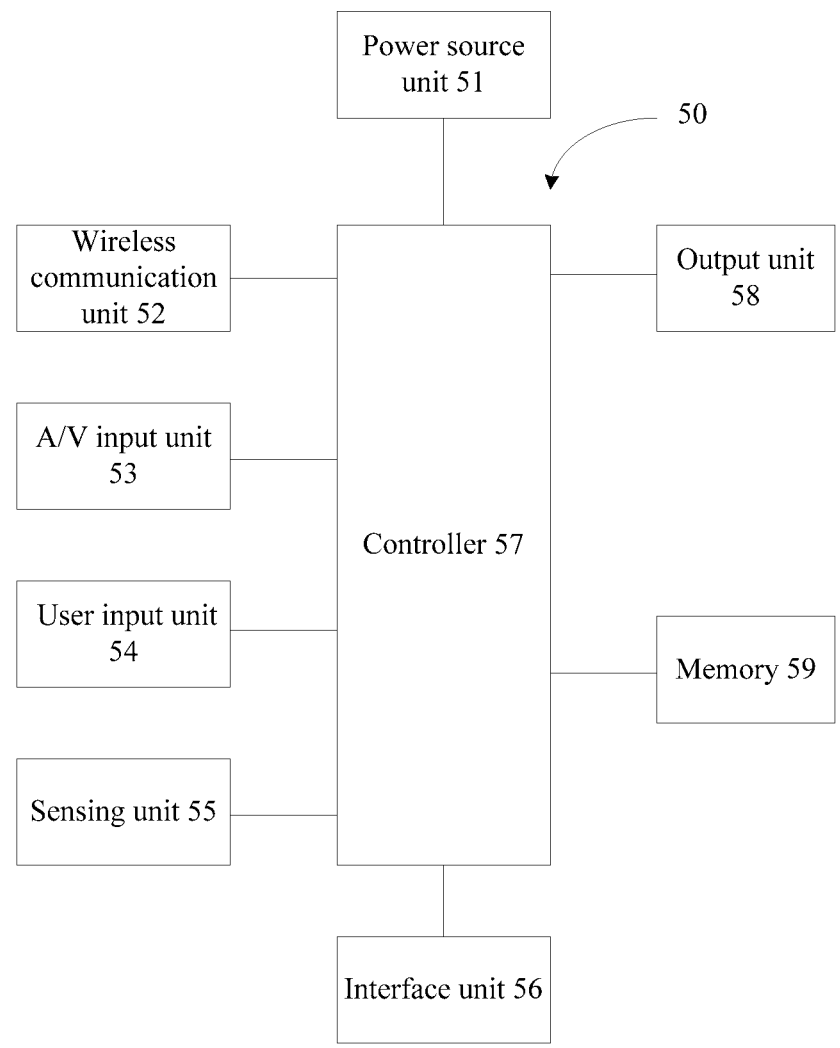
FIG. 5 is a schematic structural diagram of a three-dimensional face image reconstruction terminal according to an embodiment of the present disclosure.

FIG. 5 is a schematic diagram showing a hardware structure of a terminal according to an embodiment of the present disclosure. As shown in FIG. 5, a three-dimensional face image reconstruction terminal 50 includes components in the embodiment of the three-dimensional face image reconstruction device described above.

The terminal may be implemented in various forms. The terminal provided in the present disclosure may include, but is not limited to, mobile terminals such as mobile phones, smart phones, notebook computers, digital broadcast receivers, Personal Digital Assistants (PDAs), tablet computers (PADs), portable multimedia players (PMPs), navigation devices, in-vehicle terminals, in-vehicle display terminals and in-vehicle electronic rearview mirrors, and fixed terminals such as digital TVs and desktop computers.

As an equivalent alternative embodiment, the terminal may further include other components. As shown in FIG. 5, the three-dimensional face image reconstruction terminal 50 may include a power source unit 51, a wireless communication unit 52, an audio/video (A/V) input unit 53, a user input unit 54, a sensing unit 55, an interface unit 56, a controller 57, an output unit 58, a memory 59, and the like. Although FIG. 5 illustrates a terminal having various components, it should be understood that, not all illustrated components are required to be implemented, or more or fewer components may be implemented instead.

The wireless communication unit 52 allows for radio communication between the terminal 50 and a wireless communication system or network. The A/V input unit 53 is used for receiving an audio or video signal. The user input unit 54 may generate key input data in response to a command inputted by the user to control various operations of the terminal. The sensing unit 55 detects a current state of the terminal 50, a position of the terminal 50, the presence or absence of user touch input to the terminal 50, an orientation of the terminal 50, acceleration or deceleration movement and direction of the terminal 50, and the like, and the sensing unit 55 generates a command or signal for controlling operations of the terminal 50. The interface unit 56 serves as an interface through which at least one external device may be connected to the terminal 50. The output unit 58 is configured to provide an output signal in a visual, audio, and/or tactile manner. The memory 59 may store software programs that are executed by the controller 55 to process and control operations, or may temporarily store data that has been outputted or is to be outputted. The memory 59 may include at least one type of storage medium. Moreover, the terminal 50 may cooperate with a network storage device that performs a storage function of the memory 59 through network connection. The controller 57 typically controls the overall operation of the terminal. Additionally, the controller 57 may include a multimedia module for reproducing or playing back multimedia data. The controller 57 may perform a pattern recognition process to recognize a handwriting input or a picture drawing input performed on the touch screen as a character or an image. The power source unit 51 receives external power or internal power under the control of the controller 57 and provides appropriate power required to operate various elements and components.

Various embodiments of the video feature comparison method provided in the present disclosure may be implemented in a computer readable medium using, for example, computer software, hardware, or any combination thereof. For hardware implementation, the various embodiments of the video feature comparison method provided in the present disclosure may be implemented by using at least one of an application specific integrated circuit (ASIC), a digital signal processor (DSP), a digital signal processing device (DSPD), a programmable logic device. (PLD), a field programmable gate array (FPGA), a processor, a controller, a microcontroller, a microprocessor, and an electronic unit that is designed to perform the functions described herein. In some cases, the various embodiments of the video feature comparison method provided in the present disclosure may be implemented in the controller 57. For software implementation, the various embodiments of the video feature comparison method provided in the present disclosure may be implemented by using a separate software module that allows for the execution of at least one function or operation. Software codes may be implemented by a software application (or program) written in any suitable programming language, and may be stored in the memory 59 and is executed by the controller 57.

For a detailed description of the present embodiment, reference may be made to the corresponding description in the foregoing embodiments, and details are not described herein again.

The basic principles of the present disclosure have been described above in connection with the specific embodiments. However, it should be noted that the advantages, superiorities, effects, and the like referred to in the present disclosure are merely exemplary and are not limiting, and the advantages, superiorities and effects are not considered to be necessarily required by the various embodiments of the present disclosure. In addition, the specific details disclosed above are only for the purpose of illustration and ease of understanding, and are not intended to limit the present disclosure.

Block diagrams of elements, devices, apparatuses and systems shown in the present disclosure are merely illustrative and are not intended to require or imply that the elements, the devices, the apparatuses and the systems must be connected, arranged, and configured in the manner shown in the block diagram. As should be appreciated by those skilled in the art, these elements, devices, apparatuses and systems may be connected, arranged, and configured in any manner. Terms such as "including", "comprising" and "having" are open, and mean "including but not limited to" and may be used interchangeably. Terms "or" and "and" used herein mean the word "and/or" and may be used interchangeably unless the context clearly indicates otherwise. The term "such as" used herein refers to a phrase "such as but not limited to" and is used interchangeably.

In addition, as used herein, a word "or" used in enumeration of items starting with "at least one", indicates separate enumeration, thus enumeration such as "at least one of A, B and C" encompass cases of A or B or C, AB or AC or BC, or ABC (i.e., A and B and C). Moreover, the wording "exemplary" does not mean that the described examples are preferred or better than the other examples.

It should further be noted that in the systems and methods of the present disclosure, various components or steps may be decomposed and/or recombined. These decompositions and/or recombinations should be considered as equivalents to the present disclosure.

Various changes, substitutions and alterations of the technologies described herein may be made without departing from the teachings of the present disclosure as defined in the appended claims. Further, the scope of the claims of the present disclosure is not limited to the specific aspects of the processes, the machine, the manufacture, the composition of the event, the means, the method and the action described above. Processes, machines, manufactures, compositions of events, means, methods or actions that are presently present or later developed may be utilized to perform substantially the same functions or implement substantially the same effects as the aspects described herein. Accordingly, such process, machine, manufacture, composition of event, means, method or action are included in the scope of the appended claims.

The above description of the disclosed aspects is provided to enable those skilled in the art to make or use the present disclosure. Various modifications to these aspects are apparent to those skilled in the art, and general principles defined herein may be applied to other aspects without departing from the scope of the present disclosure. Therefore, the present disclosure is not intended to be limited to the aspects shown herein, but in the broadest scope of the principles and novel features disclosed herein.

The foregoing description has been presented for purposes of illustration and description. Further, the description is not intended to limit the embodiments of the present disclosure to the forms disclosed herein. Although a number of example aspects and embodiments have been discussed above, those skilled in the art will recognize certain variations, modifications, changes, additions and subcombinations thereof.

The invention claimed is:

1. A method of reconstructing three-dimensional face images, comprising:
   acquiring a real two-dimensional face key point and a predicted two-dimensional face key point;
   solving a first loss function consisting of the real two-dimensional face key point, the predicted two-dimensional face key point and a preset additional regular constraint term to iteratively optimize an expression coefficient, wherein the additional regular constraint term is configured to constrain the expression coefficient such that the expression coefficient represents a real state of a face, the additional regular constraint term is constituted of an expression basis vector in a core tensor, wherein the core tensor further includes an identity basis vector;
   solving a second loss function consisting of the real two-dimensional face key point, the predicted two-dimensional face key point and the regular constraint term to iteratively optimize the identity coefficient; and
   performing a dot product operation on the expression coefficient and the identity coefficient with the core tensor to obtain a three-dimensional face image.

2. The method according to claim 1, further comprising:
   acquiring three-dimensional face models of a plurality of people with different expressions and a three-dimensional face key point on each of the three-dimensional face models; and
   semantically decomposing the three-dimensional face model and the three-dimensional face key point in an expression dimension to obtain an expression basis vector in a core tensor of the three-dimensional deformable model, wherein the expression basis vector constitutes the additional regular constraint term.

3. The method according to claim 2, wherein
   the additional regular constraint term is expressed as $$\lambda_{sym} \sum_{i \in LB, j \in RB} \|e_i - e_j\|^2,$$

wherein $\|\cdot\|$ indicates a two-norm of a vector, $\lambda_{sym}$ indicates a regular term coefficient of a portion other than an eye portion, LB indicates an index set of expression basis vectors of a left half portion of the face other than the eye, and RB indicates an index set of an expression basis vectors of a right half portion of the face other than the eye, $e_i$ indicates an i-th expression coefficient of the left half portion of the face other than the eye, and $e_j$ indicates a j-th expression coefficient of the right half portion of the face of other than the eye; or the additional regular constraint term is expressed as $$\lambda_{eye} \sum_{i \in LE, j \in RE} \|e_i - e_j\|^2,$$

wherein $\lambda_{eye}$ indicates a regular term coefficient of an eye portion, LE indicates an index set of expression basis vectors associated with an left eye, RE indicates an index set of expression basis vectors associated with an right eye, $e_i$ indicates an i-th expression coefficient associated with the left eye, and $e_j$ indicates a j-th expression coefficient associated with the right eye; or the additional regular constraint term is expressed as $$\lambda_{sym} \sum_{i \in LB, j \in RB} \|e_i - e_j\|^2 + \lambda_{eye} \sum_{i \in LE, j \in RE} \|e_i - e_j\|^2.$$

4. The method according to claim 3, wherein
   when the additional regular constraint term is expressed as $$\lambda_{sym} \sum_{i \in LB, j \in RB} \|e_i - e_j\|^2,$$

the first loss function is expressed as $$\text{loss} = \|L_P - L_t\|^2 + \lambda \|e\|^2 + \lambda_{sym} \sum_{i \in LB, j \in RB} \|e_i - e_j\|^2;$$

or
   when the additional regular constraint term is expressed as $$\lambda_{eye} \sum_{i \in LE, j \in RE} \|e_i - e_j\|^2,$$

the first loss function is expressed as $$\text{loss} = \|L_P - L_t\|^2 + \lambda \|e\|^2 + \lambda_{eye} \sum_{i \in LE, j \in RE} \|e_i - e_j\|^2;$$

or
   when that the additional regular constraint term is expressed as $$\lambda_{sym} \sum_{i \in LB, j \in RB} \|e_i - e_j\|^2 + \lambda_{eye} \sum_{i \in LE, j \in RE} \|e_i - e_j\|^2,$$

the first loss function is expressed as $$\text{loss} = \|L_P - L_t\|^2 + \lambda \|e\|^2 + \lambda_{sym} \sum_{i \in LB, j \in RB} \|e_i - e_j\|^2 + \lambda_{eye} \sum_{i \in LE, j \in RE} \|e_i - e_j\|^2,$$

wherein $L_P$ indicates a position of the predicted two-dimensional face key point, $L_t$ indicates a position of the real two-dimensional face key point, $\lambda$ indicates an overall regular term coefficient of the face, and e represents an overall expression coefficient of the face.

5. The method according to claim 3, wherein $\lambda_{eye}$ is expressed as $$\lambda_{eye} = \begin{cases} \alpha \\ \beta \end{cases};$$

wherein $\alpha$ indicates a regular term coefficient in a case that a single eye is closed, and $\beta$ indicates a regular term coefficient in a case that two eyes are closed or the two eyes are open.

6. The method according to claim 5, further comprising:
determining, based on a distance between two-dimensional key points of upper and lower eyelids of each of the two eyes, an eye closed state of the eye; and
determining a value of $\lambda_{eye}$ based on eye closed states of the two eyes, wherein $\alpha$ is less than $\beta$.

7. The method according to claim 2, further comprising:
decomposing the three-dimensional face model and the three-dimensional face key point in an identity dimension to obtain an identity basis vector in the core tensor; and
acquiring the predicted two-dimensional face key point based on the core tensor comprising the identity basis vector and the expression basis vector.

8. The method according to claim 7, wherein the acquiring the predicted two-dimensional face key point based on the core tensor comprises:
constructing an initial three-dimensional face image based on a preset initial value of an identity coefficient, a preset initial value of the expression coefficient, and the core tensor; and
performing a rotation and translation operation on the initial three-dimensional face image, and projecting a three-dimensional face marker point in the initial three-dimensional face image on a picture by pinhole imaging, to obtain the predicted two-dimensional face key point.

9. The method according to claim 1, further comprising:
solving a third loss function consisting of the real two-dimensional face key point and the predicted two-dimensional face key point to iteratively optimize at least one of parameters comprising a rotation matrix, a translation vector and a focal length; and
correcting the three-dimensional face image based on the at least one parameter.

10. A device of reconstructing three-dimensional face images, comprising:
at least one processor; and
at least one memory communicatively coupled to the at least one processor and storing instructions that upon execution by the at least one processor cause the device to:
acquire a real two-dimensional face key point and a predicted two-dimensional face key point;
solve a first loss function consisting of the real two-dimensional face key point, the predicted two-dimensional face key point and a preset additional regular constraint term to iteratively optimize an expression coefficient, wherein the additional regular constraint term is used for constraining the expression coefficient such that the expression coefficient represents a real state of a face, the additional regular constraint term is constituted of an expression basis vector in a core tensor, wherein the core tensor further includes an identity basis vector;
solve a second loss function consisting of the real two-dimensional face key point, the predicted two-dimensional face key point and the regular constraint term to iteratively optimize the identity coefficient;
perform a dot product operation on the expression coefficient and the identity coefficient with the core tensor to obtain a three-dimensional face image.

11. The device according to claim 10, wherein the at least one memory further stores instructions that upon execution by the at least one processor cause the device system to:
acquire three-dimensional face models of a plurality of people with different expressions and a three-dimensional face key point on each of the three-dimensional face models; and
semantically decompose the three-dimensional face model and the three-dimensional face key point in an expression dimension to obtain an expression basis vector in a core tensor of the three-dimensional deformable model, wherein the expression basis vector constitutes the additional regular constraint term.

12. The device according to claim 11, wherein
the additional regular constraint term is expressed as $$\lambda_{sym} \sum_{i \in LB, j \in RB} \|e_i - e_j\|^2,$$

wherein $\|\cdot\|$ indicates a two-norm of a vector, $\lambda_{sym}$ indicates a regular term coefficient of a portion other than an eye portion, LB indicates an index set of expression basis vectors of a left half portion of the face other than the eye, and RB indicates an index set of an expression basis vectors of a right half portion of the face other than the eye, $e_i$ indicates an i-th expression coefficient of the left half portion of the face other than the eye, and $e_j$ indicates a j-th expression coefficient of the right half portion of the face of other than the eye; or the additional regular constraint term is expressed as $$\lambda_{eye} \sum_{i \in LE, j \in RE} \|e_i - e_j\|^2,$$

wherein $\lambda_{eye}$ indicates a regular term coefficient of an eye portion, LE indicates an index set of expression basis vectors associated with an left eye, RE indicates an index set of expression basis vectors associated with an right eye, $e_i$ indicates an i-th expression coefficient associated with the left eye, and $e_j$ indicates a j-th expression coefficient associated with the right eye; or the additional regular constraint term is expressed as $$\lambda_{sym} \sum_{i \in LB, j \in RB} \|e_i - e_j\|^2 + \lambda_{eye} \sum_{i \in LE, j \in RE} \|e_i - e_j\|^2.$$

13. The device according to claim 11, wherein the at least one memory further stores instructions that upon execution by the at least one processor cause the device to:
  decompose the three-dimensional face model and the three-dimensional face key point in an identity dimension to obtain an identity basis vector in the core tensor; and
  acquire the predicted two-dimensional face key point based on the core tensor comprising the identity basis vector and the expression basis vector.

14. The device according to claim 13, wherein the at least one memory further stores instructions that upon execution by the at least one processor cause the device to:
  construct an initial three-dimensional face image based on a preset initial value of an identity coefficient, a preset initial value of the expression coefficient, and the core tensor; and
  perform a rotation and translation operation on the initial three-dimensional face image, and project a three-dimensional face marker point in the initial three-dimensional face image on a picture by pinhole imaging, to obtain the predicted two-dimensional face key point.

15. The device according to claim 10, wherein the at least one memory further stores instructions that upon execution by the at least one processor cause the device to:
  solve a third loss function consisting of the real two-dimensional face key point and the predicted two-dimensional face key point to iteratively optimize at least one of parameters comprising a rotation matrix, a translation vector and a focal length; and
  correct the three-dimensional face image based on the at least one parameter.

16. A computer readable storage medium having stored thereon non-transitory computer readable instructions that, when executed by a computer, cause the computer to perform operations, the operations comprising:
  acquiring a real two-dimensional face key point and a predicted two-dimensional face key point;
  solving a first loss function consisting of the real two-dimensional face key point, the predicted two-dimensional face key point and a preset additional regular constraint term to iteratively optimize an expression coefficient, wherein the additional regular constraint term is configured to constrain the expression coefficient such that the expression coefficient represents a real state of a face, the additional regular constraint term is constituted of an expression basis vector in a core tensor, wherein the core tensor further includes an identity basis vector;
  solving a second loss function consisting of the real two-dimensional face key point, the predicted two-dimensional face key point and the regular constraint term to iteratively optimize the identity coefficient; and
  performing a dot product operation on the expression coefficient and the identity coefficient with the core tensor to obtain a three-dimensional face image.

17. The device according to claim 12, wherein $\lambda_{eye}$ is expressed as $$\lambda_{eye} = \begin{cases} \alpha \\ \beta \end{cases};$$

wherein $\alpha$ indicates a regular term coefficient in a case that a single eye is closed, and $\beta$ indicates a regular term coefficient in a case that two eyes are closed or the two eyes are open.

18. The device according to claim 17, wherein the at least one memory further stores instructions that upon execution by the at least one processor cause the device to:
  determine, based on a distance between two-dimensional key points of upper and lower eyelids of each of the two eyes, an eye closed state of the eye; and
  determine a value of $\lambda_{eye}$ based on eye closed states of the two eyes, wherein $\alpha$ is less than $\beta$.

* * * * *